(12) United States Patent
Browne et al.

(10) Patent No.: US 8,876,579 B2
(45) Date of Patent: Nov. 4, 2014

(54) SHAPE MEMORY ALLOY ACTUATED HVAC OUTLET AIRFLOW BAFFLE CONTROLLERS

(75) Inventors: Alan L. Browne, Grosse Pointe, MI (US); Nancy L. Johnson, Northville, MI (US); Michael E. Nishek, Ortonville, MI (US); James Holbrook Brown, Temecula, CA (US); Xiujie Gao, Troy, MI (US)

(73) Assignees: GM Global Technology Operations LLC, Detroit, MI (US); Dynalloy, Inc., Costa Mesa, CA (US)

( * ) Notice: Subject to any disclaimer, the term of this patent is extended or adjusted under 35 U.S.C. 154(b) by 456 days.

(21) Appl. No.: 13/253,150

(22) Filed: Oct. 5, 2011

(65) Prior Publication Data
US 2012/0184195 A1 Jul. 19, 2012

Related U.S. Application Data

(60) Provisional application No. 61/432,789, filed on Jan. 14, 2011.

(51) Int. Cl.
| | | |
|---|---|---|
| *B60H 1/00* | (2006.01) | |
| *B61D 27/00* | (2006.01) | |
| *B63J 2/00* | (2006.01) | |
| *B64D 13/00* | (2006.01) | |
| *B60H 1/34* | (2006.01) | |

(52) U.S. Cl.
CPC ...... *B60H 1/3421* (2013.01); *B60H 2001/3471* (2013.01)
USPC .............................................. 454/75; 454/155

(58) Field of Classification Search
USPC .................................................. 454/75, 155
See application file for complete search history.

(56) References Cited

U.S. PATENT DOCUMENTS

| | | | | | |
|---|---|---|---|---|---|
| 4,555,981 | A | * | 12/1985 | McCabe | 454/369 |
| 4,676,146 | A | * | 6/1987 | Takahashi et al. | 454/256 |
| 4,949,699 | A | * | 8/1990 | Gerber | 124/44.5 |
| 5,063,833 | A | * | 11/1991 | Hara et al. | 454/152 |
| 5,071,064 | A | * | 12/1991 | AbuJudom et al. | 236/1 G |
| 5,107,916 | A | * | 4/1992 | van Roermund et al. | 160/6 |
| 5,238,447 | A | * | 8/1993 | Weissbrich et al. | 454/75 |
| 5,433,660 | A | * | 7/1995 | Ohba | 454/75 |
| 6,209,404 | B1 | * | 4/2001 | Le | 74/89.18 |
| 6,446,876 | B1 | * | 9/2002 | Stefano et al. | 236/49.3 |

(Continued)

FOREIGN PATENT DOCUMENTS

| | | |
|---|---|---|
| CN | 1474122 A | 2/2004 |
| DE | 10121904 A1 | 11/2002 |
| DE | 10330621 A1 | 2/2005 |
| DE | 112007000934 T5 | 2/2009 |

*Primary Examiner* — Steven B McAllister
*Assistant Examiner* — Jonathan Cotov
(74) *Attorney, Agent, or Firm* — Quinn Law Group, PLLC

(57) ABSTRACT

A baffle controller for moving a baffle disposed within an HVAC outlet housing between an open position and a closed position to control airflow through an HVAC outlet in a vehicle includes a Shape Memory Alloy (SMA) actuator that is controlled and actuated by an electrical signal. The SMA actuator rotates a main lever that rotates a valve plate. The valve plate is attached to the baffle such that the baffle rotates with the valve plate. The baffle controller may include a position biasing device that increases a position holding ability of the baffle controller, and a cut-off switch that interrupts the electrical signal to the SMA actuator to prevent over-rotating the baffle.

13 Claims, 3 Drawing Sheets

(56) References Cited

U.S. PATENT DOCUMENTS

| | | | |
|---|---|---|---|
| 7,017,345 B2* | 3/2006 | Von Behrens et al. | 60/527 |
| 7,498,926 B2* | 3/2009 | Browne et al. | 340/425.5 |
| 7,597,616 B2* | 10/2009 | Browne et al. | 454/155 |
| 7,866,737 B2* | 1/2011 | Browne et al. | 296/193.1 |
| 8,408,981 B2* | 4/2013 | Su et al. | 454/358 |
| 8,414,366 B2* | 4/2013 | Browne et al. | 454/162 |
| 2002/0050530 A1* | 5/2002 | Stefano et al. | 236/49.3 |
| 2006/0172694 A1* | 8/2006 | Gau et al. | 454/333 |
| 2007/0123158 A1* | 5/2007 | Shibata et al. | 454/130 |
| 2007/0243810 A1 | 10/2007 | Browne et al. | |
| 2008/0119125 A1* | 5/2008 | Guerreiro | 454/75 |

\* cited by examiner

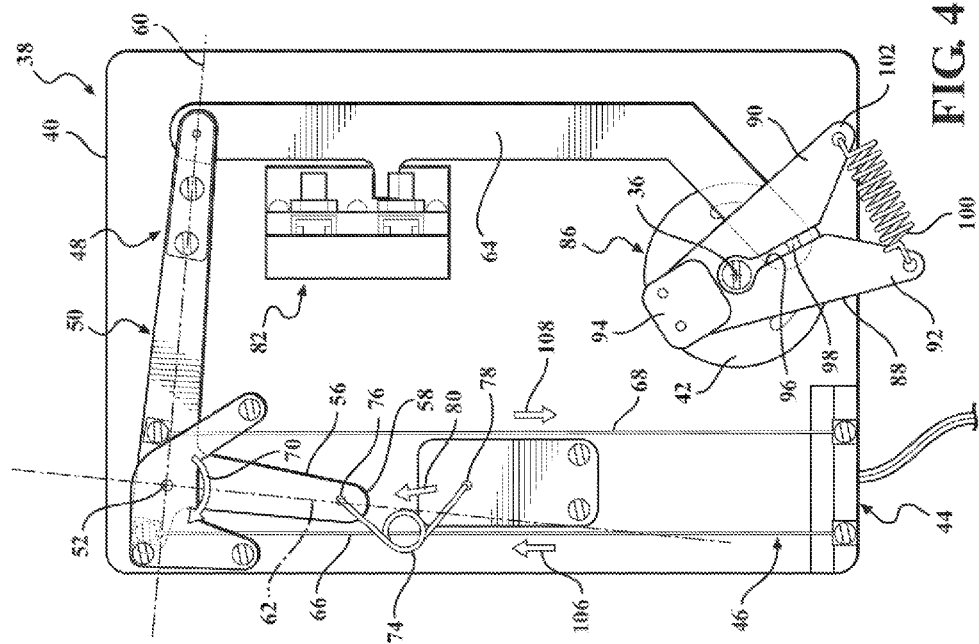
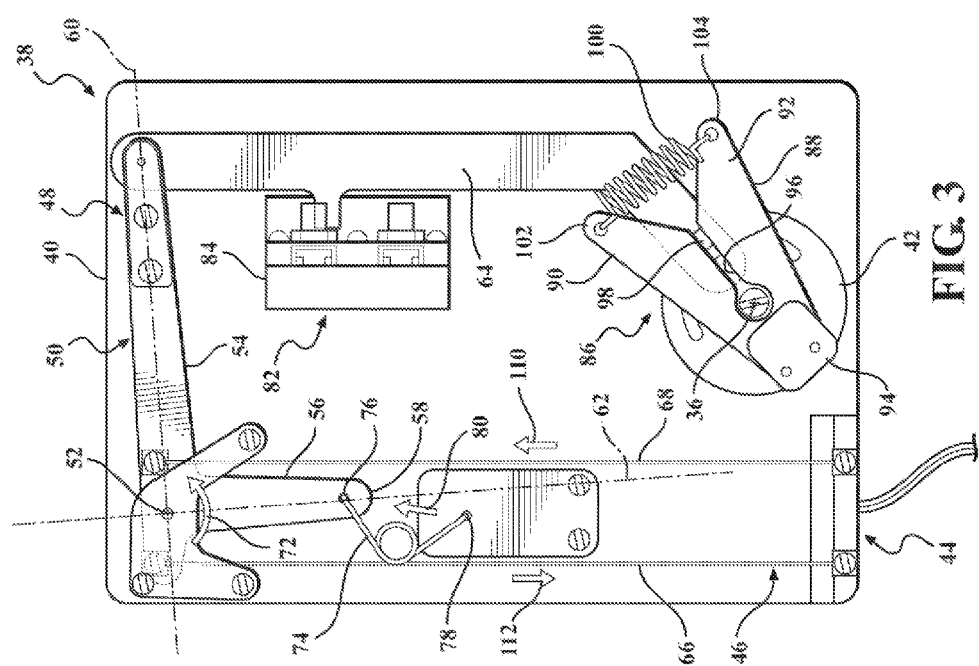

SHAPE MEMORY ALLOY ACTUATED HVAC OUTLET AIRFLOW BAFFLE CONTROLLERS

CROSS-REFERENCE TO RELATED APPLICATIONS

This application claims the benefit of U.S. Provisional Patent Application Ser. No. 61/432,789, filed on Jan. 14, 2011, the disclosure of which is hereby incorporated by reference.

TECHNICAL FIELD

The invention generally relates to a baffle controller for moving a baffle between an open position and a closed position within a HVAC outlet housing to control airflow through a Heating Ventilation Air Conditioning (HVAC) outlet of a vehicle.

BACKGROUND

Vehicles include HVAC outlets disposed to direct a flow of air into a passenger compartment of the vehicle. A system of ducts connects the HVAC outlets with air supplies, e.g., a heating air supply, a cooling air supply or a fresh air supply. A baffle is disposed within an HVAC outlet housing adjacent each of the HVAC outlets. Alternatively, the baffle may be disposed within one of the ducts adjacent the HVAC outlet housing. The baffle may be manually operated via a mechanical linkage to move the baffle between an open position and a closed position, thereby controlling the flow of air through the HVAC outlet. The baffles are independently operated so that one individual baffle in one of the HVAC outlets may be closed to limit and/or prevent airflow directed at one portion of the passenger compartment, thereby increasing airflow to the other HVAC outlets to increase airflow to another portion of the passenger compartment.

SUMMARY

A vehicle is provided. The vehicle includes a body that defines a passenger compartment. A support structure is supported by the body within the passenger compartment. The support structure defines a HVAC outlet that is configured for exhausting a flow of air into the passenger compartment. An HVAC outlet housing is coupled to the support structure. The HVAC outlet housing is configured for directing the flow of air to the HVAC outlet. A baffle is disposed within the HVAC outlet housing. The baffle is moveable between an open position and a closed position. When in the open position, the baffle allows airflow through the HVAC outlet housing. When in the closed position, the baffle blocks airflow through the HVAC outlet housing. A baffle controller is coupled to the baffle. The baffle controller is actuated in response to an electrical signal to move the baffle between the open position and the closed position.

Accordingly, because the baffle controller is actuated by an electrical signal, the baffle controller may be remotely operated on-demand by button activation, or may be automatically operated by a controller. Furthermore, the baffle controller eliminates the existing plastic mechanical linkage previously used to operate the baffle, thereby providing increased robustness.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic plan view of the baffle controller when the baffle is in an open position.

FIG. 4 is a schematic plan view of the baffle controller when the baffle is in a closed position.

DETAILED DESCRIPTION

Figure 1:
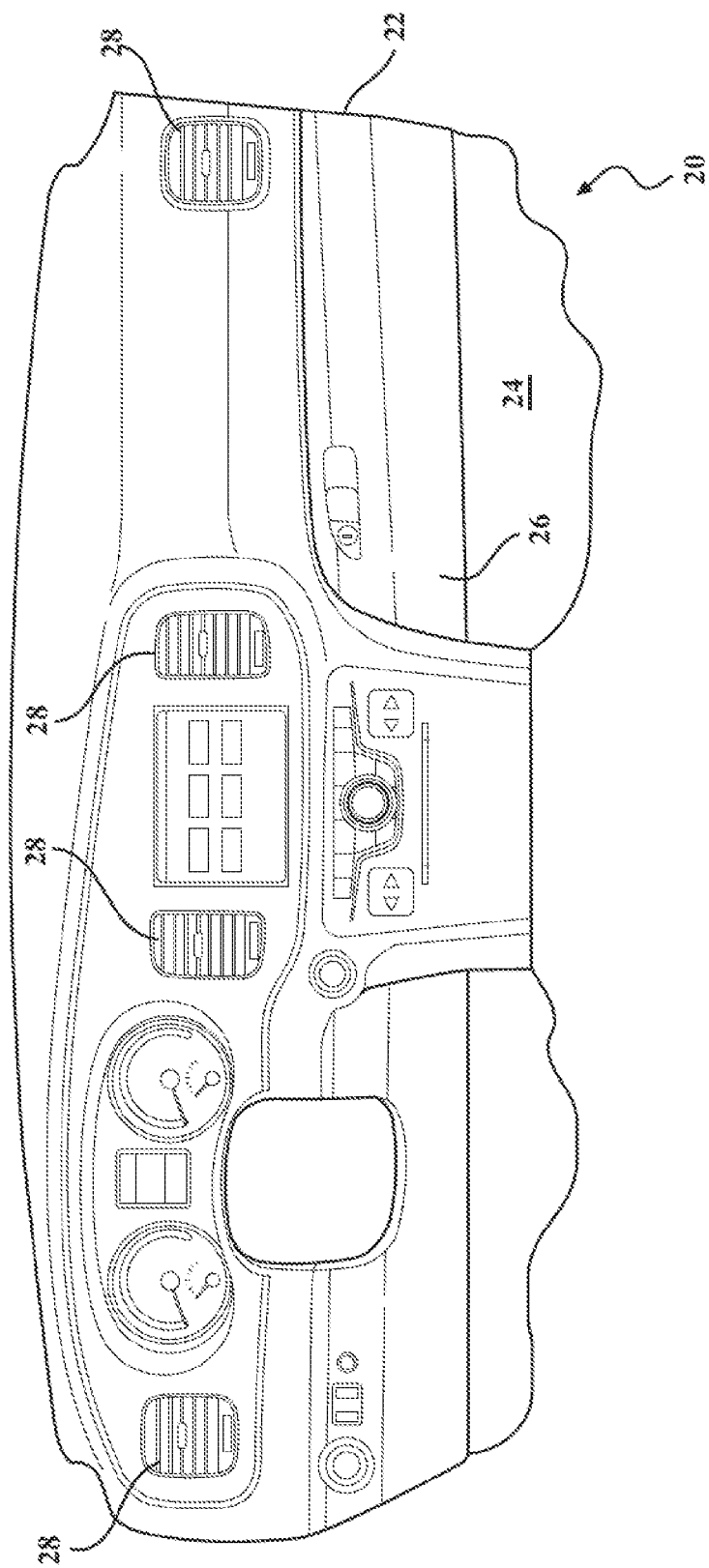
FIG. 1 is a schematic plan view of a support structure of a vehicle showing a plurality of HVAC outlets.
Figure 2:
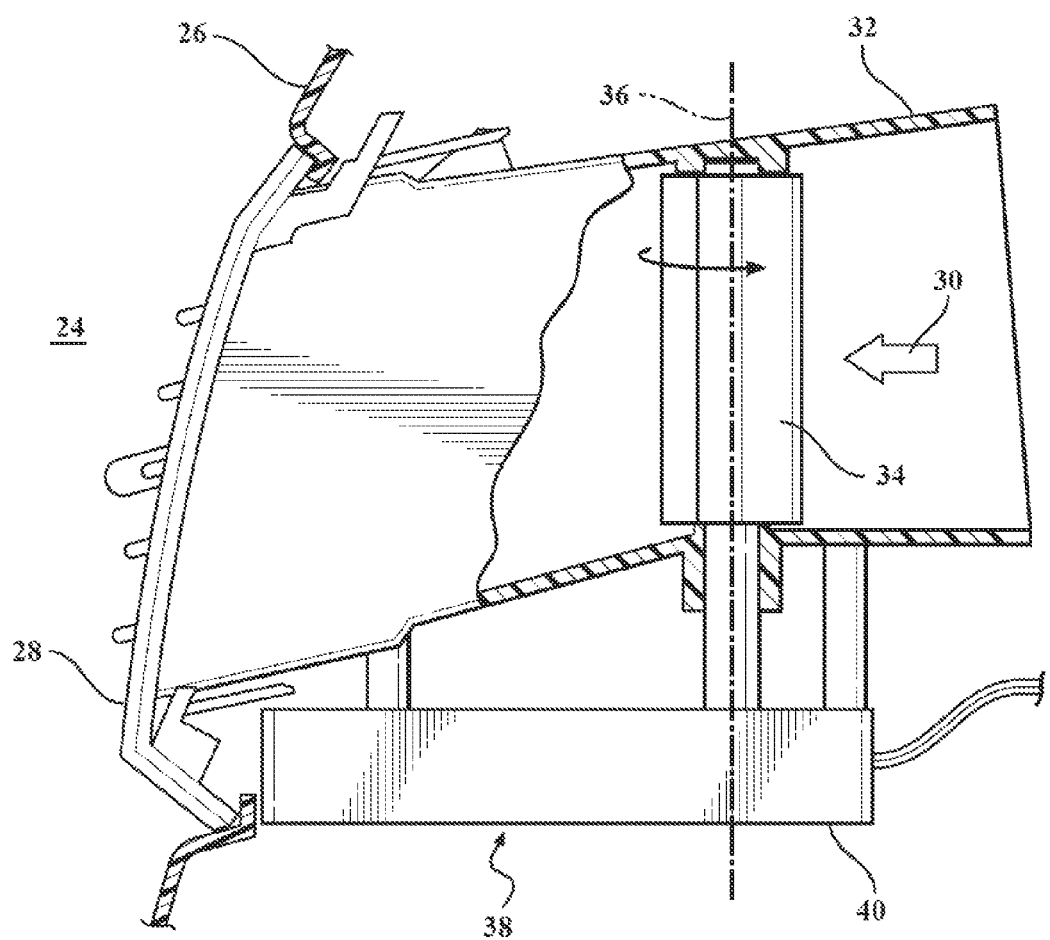
FIG. 2 is a schematic cross sectional view of the support structure showing a HVAC outlet housing connected to the HVAC outlet, a baffle disposed within the HVAC outlet housing for controlling air flow through the HVAC outlet housing, and a baffle controller coupled to the HVAC outlet housing for controlling the baffle.

Referring to the Figures, wherein like numerals indicate like parts throughout the several views, a vehicle is generally shown at 20. Referring to FIGS. 1 and 2, the vehicle 20 includes a body 22 that defines a passenger compartment 24. A support structure 26 is supported by the body 22 within the passenger compartment 24. The support structure 26 may include a dashboard, such as shown in FIGS. 1 and 2, or may alternatively include but is not limited to a roof liner, a center console or some other interior trim component or structure of the passenger compartment 24. The support structure 26 defines at least one Heating Ventilation Air Conditioning (HVAC) outlet 28. The HVAC outlet 28 is configured for exhausting a flow of air, indicated by flow arrow 30, into the passenger compartment 24. The vehicle 20 may include any suitable type of vehicle 20, including but not limited to a car, a truck or an airplane.

An HVAC outlet housing 32 is coupled to the support structure 26. The HVAC outlet housing 32 is configured to direct the flow of air to the HVAC outlet 28. The HVAC outlet housing 32 is in fluid communication with at least one air supply source (not shown) through a system of passageways. The air supply source may include but is not limited to a fresh air supply, a heated air supply or a cooled air supply. The air supply source provides the flow of air, which is directed through the system of passageways to the HVAC outlet housing 32, and thereby to the HVAC outlet 28.

As shown, a baffle 34 is disposed within the HVAC outlet housing 32. However, the baffle 34 may be disposed within one of the passageways adjacent each of the HVAC outlet housings 32. The baffle 34 is moveable between an open position and a closed position. The baffle 34 rotates about a rotation axis 36 between the open position and the closed position. When in the open position, the baffle 34 is turned substantially parallel with the airflow through the HVAC outlet housing 32, thereby allowing airflow through the HVAC outlet 28. When in the closed position, the baffle 34 is turned substantially perpendicularly relative to a direction of airflow through the HVAC outlet housing 32, thereby blocking airflow through the HVAC outlet 28.

A baffle controller 38 is coupled to the baffle 34. The baffle controller 38 is disposed adjacent the HVAC outlet housing 32 near the HVAC outlet 28. The baffle controller 38 is actuated in response to an electrical signal, e.g., an electrical current, to move the baffle 34 between the open position and the closed position. Accordingly, the baffle controller 38 may be remotely activated by pressing a button in electrical communication with the baffle controller 38, or may be automatically actuated by a controller, such as a vehicle 20 temperature control module.

Referring to FIGS. 3 and 4, the baffle controller 38 includes a housing 40. A valve plate 42 is rotatably supported by the housing 40, and is attached to the baffle 34 for rotation with the baffle 34. The valve plate 42 may be attached to the baffle 34 in any suitable manner, including but not limited to an intermediate shaft extending between and interconnecting the valve plate 42 and the baffle 34.

The baffle controller 38 includes an electrically controlled actuator 44. The electrically controlled actuator 44 may include but is not limited to a shape memory alloy actuator system 46. While the electrically controlled actuator 44 is described and shown herein as including the shape memory alloy wire actuator system 46, it should be appreciated that the electrically controlled actuator 44 may alternatively include an electric motor, an electric solenoid, or an electro-hydraulic or electro-pneumatic actuator.

The baffle controller 38 includes a linkage system 48 that interconnects the electrically controlled actuator 44, i.e., the shape memory alloy based actuator system 46, and the valve plate 42. The linkage system 48 includes a main lever 50 pivotably attached to the housing 40 for pivoting movement about a pivot axis 52. The main lever 50 includes a main beam 54 and a second beam 56 extending from the main beam 54 to a distal end 58. The second beam 56 and the main beam 54 of the main lever 50 form an angle therebetween that is substantially equal to ninety degrees (90°). As shown, a longitudinal axis, 60 of the main beam 54 and a longitudinal axis, 62 of the second beam 56 intersect at the pivot axis 52 of the main lever 50. The linkage system 48 further includes a first link 64. The first link 64 interconnects the main lever 50 and the valve plate 42. The main beam 54 extends between the shape memory alloy actuator system 46 and the first link 64. The main lever 50, and more specifically the main beam 54, are connected to the first link 64 and form an angle therebetween that is substantially equal to ninety degrees (90°).

As shown, the shape memory alloy actuator system 46 includes a first shape memory alloy actuator 66 and a second shape memory alloy actuator 68. The first shape memory alloy actuator 66 and the second shape memory alloy actuator 68 are disposed in an antagonistic arrangement relative to each other. The first shape memory alloy actuator 66 is attached to the main beam 54 on a first side of the pivot axis 52. The second shape memory alloy actuator 68 is attached to the main beam 54 on a second side of the pivot axis 52, opposite the first shape memory alloy actuator 66. As such, the first shape memory alloy actuator 66 and the second shape memory alloy actuator 68 are disposed on opposite sides of the pivot axis 52.

Only one of the first shape memory alloy actuator 66 and the second shape memory alloy actuator 68 is electrically actuated at a time. When electrically actuated the shape memory alloy actuators 66, 68 contract to a pre-defined or remembered position, dimension or shape. Accordingly, electrically actuating one of the first shape memory alloy actuator 66 and the second shape memory alloy actuator 68 contracts the electrically actuated actuator, thereby causing the main beam 54 to pivot in one direction, which causes the other of the first shape memory alloy actuator 66 and the second shape memory alloy actuator 68 to stretch. More specifically, referring to FIG. 3, actuation of the first shape memory alloy actuator 66 contracts the first shape memory alloy actuator 66, in a direction indicated by direction arrow 112, causing the main lever 50 to pivot about the pivot axis 52 in a first direction 72. Because the second shape memory alloy actuator 68 is attached to the main lever 50 on an opposite side of the pivot axis 52, the second shape memory alloy actuator 68 must move in an opposite direction relative to the first shape memory alloy actuator 66, in a direction indicated by direction arrow 110, thereby causing the second shape memory alloy actuator 68 to stretch or elongate. Similarly, referring to FIG. 4, actuation of the second shape memory alloy actuator 68 contracts the second shape memory alloy actuator 68 in a direction indicated by arrow 108, causing the main lever 50 to pivot about the pivot axis 52 in a second direction 70. The second direction 70 is opposite the first direction 72. Accordingly, if the first direction 72 is a clockwise direction, then the second direction 70 would be a counter-clockwise direction. Because the first shape memory alloy actuator 66 is attached to the main lever 50 on an opposite side of the pivot axis 52, the first shape memory alloy actuator 66 must move in an opposite direction relative to the second shape memory alloy actuator 68, in a direction indicated by arrow 106, thereby causing the first shape memory alloy actuator 66 to stretch or elongate. This opposing contraction and elongation between the first shape memory alloy actuator 66 and the second shape memory alloy actuator 68 defines the antagonistic relationship relative to each other.

While the embodiment of the shape memory actuator shown and described herein is that of the antagonistic arrangement between the first shape memory alloy actuator 66 and the second shape memory alloy actuator 68, it should be appreciated that the shape memory alloy actuator system 46 may be configured and operate in some other manner. For example, the shape memory alloy actuator system 46 may be configured, but is not limited to, a single shape memory alloy element countered by a spring element; two shape memory alloy elements, with a first shape memory alloy element operating against a spring element to actuate the baffle 34 and a second shape memory alloy element configured to release a latch mechanism; or a single shape memory alloy actuator utilizing a push-push or a pull-pull latching/unlatching arrangement. As such, the specific configuration and operation of the shape memory alloy actuator system 46 is not limited to the specific exemplary embodiment described and shown in detail herein, i.e., the antagonistic arrangement between the first shape memory alloy actuator 66 and the second shape memory alloy actuator 68.

Referring to FIGS. 3 and 4, the baffle controller 38 includes a position biasing device 74 interconnecting the main lever 50 and the housing 40. The position biasing device 74 may include but is not limited to a torsion spring or the like. More specifically, the position biasing device 74 is connected to the housing 40 and to the distal end 58 of the second beam 56 of the main lever 50. The position biasing device 74 is configured for biasing the baffle 34 into the open position when the baffle 34 is disposed in the open position, and for biasing the baffle 34 into the closed position when the baffle 34 is disposed in the closed position. As shown, the position biasing device 74 includes a first end 76 attached to the distal end 58 of the second beam 56, and a second end 78 attached to the housing 40.

The position biasing device 74 provides a vector force 80 that is angled relative to the longitudinal axis 62 of the second beam 56 when the baffle 34 is in each of the open position and the closed position. When the baffle 34 is positioned in the open position, the vector force 80 is angled relative to the second beam 56 to cause rotation of the main lever 50 in the first direction 72. When the baffle 34 is positioned in the closed position, the vector force 80 is angled relative to the longitudinal axis 62 of the second beam 56 to cause rotation of the main lever 50 in the second direction 70, opposite the first direction 72. When the baffle controller 38 positions the baffle 34 in the open position, the vector force 80 biases against the second beam 56 of the main lever 50 in a direction that creates a moment arm in the second beam 56 that further biases the baffle 34 into the open position. When the shape memory alloy actuator system 46 moves the baffle 34 to the closed position, the vector force 80 of the position biasing device 74 rotates over center until the vector force 80 is angled relative to the longitudinal axis 62 of the second beam 56 in an opposite direction, thereby urging the main lever 50 in an opposite direction of rotation. Accordingly, when the baffle controller 38 moves the baffle 34 from the open position into the closed position, the vector force 80 also moves to redirect the biasing force in a direction that creates a moment arm in the second beam 56 that further biases the baffle 34 into the closed position.

The baffle controller 38 may include a cut-off switch 82 that is configured for interrupting the electrical signal to the electrically controlled actuator 44, e.g., the shape memory alloy actuator system 46. The cut-off switch 82 stops actuation of the shape memory alloy actuator system 46 in response to movement beyond a pre-determined limit, thereby preventing over rotation of the baffle 34 and overheating and thus cycle life damage to the shape memory alloy actuator system 46. The cut-off switch 82 may include but is not limited to one of a contact switch 84, a photo-interrupter switch or a time limit switch. As shown, the cut-off switch 82 includes a contact switch 84 that is attached to the housing 40 and coupled to the first link 64. The contact switch 84 interrupts the electric signal to the shape memory alloy actuator system 46 to stop the electrical actuation of the shape memory alloy actuator system 46. The contact switch 84 interrupts the electric signal in response to movement of the first link 64 beyond a pre-determined limit. It should be appreciated that the cut-off switch 82 may be incorporated into the baffle controller 38 in some other manner not shown or described herein, and that the scope of the claims is not limited to the specific exemplary embodiment shown and described herein.

The baffle controller 38 may further include a strain relief mechanism 86. The strain relief mechanism 86 interconnects the baffle 34 and the valve plate 42. The strain relief mechanism 86 is configured for limiting stress on the baffle 34 to a pre-defined limit. Accordingly, if the baffle 34 becomes lodged within the HVAC outlet housing 32 and unable to rotate further, the strain relief mechanism 86 operates to limit the stress, i.e., force, transferred to the baffle 34 to prevent damage to the baffle 34 and/or the baffle controller 38, and most importantly limit the stress in the shape memory actuator system 46 to safe levels that do not damage the shape memory alloy actuator system 46. As shown, the strain relief mechanism 86 includes a split flex plate 88 that is attached to and moveable with the baffle 34. The split flex plate 88 includes a first arm portion 90 and a second arm portion 92. Each of the first arm portion 90 and the second arm portion 92 extend outward from a core 94 to a distal open end. The first arm portion 90 and the second arm portion 92 define a slot 96 therebetween. A pin 98 is attached to and moveable with the valve plate 42. The pin 98 extends through the slot 96 in the split flex plate 88. The pin 98 includes a diameter substantially equal to a width of the slot 96 in the split flex plate 88 under normal operating conditions. A strain relief biasing device 100, including but not limited to a spring or the like, is attached to a first distal end 102 of the first arm and a second distal end 104 of the second arm, at the open distal edge of the split flex plate 88. The strain relief biasing device 100 is configured to bias the first distal end 102 and the second distal end 104 together, and provide a resistive force against spreading of the slot 96 between the first arm portion 90 and the second arm portion 92.

The first arm portion 90 and the second arm portion 92 of the split flex plate 88 flex relative to each other when the stress level on the baffle 34 exceeds the pre-defined limit. The first arm portion 90 and the second arm portion 92 flex to limit the movement of the valve plate 42, which thereby reduces the rotational force, i.e., torque, transferred to the baffle 34 from the linkage system 48. In use, should the baffle 34 become blocked and refuse to rotate, the split flex plate 88 will also refuse to rotate. As the pin 98 is attached to the valve plate 42, the pin 98 will continue to rotate as controlled by the shape memory alloy actuator system 46 and/or the position biasing device 74. The pin 98 will therefore rotate against one of the first arm portion 90 and the second arm portion 92, causing the slot 96 to widen, i.e., spreading the slot 96 in the split flex plate 88. However, because the split flex plate 88 may flex, the torque applied to the baffle 34 is limited, thereby protecting the shape memory alloy actuator system 46, the baffle 34 and/or other components of the baffle controller 38 from damage. For example, if the baffle 34 is blocked when in the closed position, the split flex plate 88 continues to rotate relative to the valve plate 42. As such, the split flex plate 88 will be positioned in the open position while the valve plate 42 is positioned in the closed position. During the next closing event, the valve plate 42 remains in the closed position, and a strain relief event occurs such that the split flex plate 88 moves back to the correct, i.e., initial position relative to the valve plate 42 in response to further rotation of the valve plate 42 (and the baffle 34 therewith).

Referring back to FIG. 1, while the vehicle 20 is described above as including only a single HVAC outlet 28 having the HVAC outlet housing 32, baffle 34 and baffle controller 38 associated therewith, it should be appreciated that the vehicle 20 may include a plurality of HVAC outlets 28, with each of the HVAC outlets 28 having a HVAC outlet housing 32, baffle 34 and baffle controller 38 associated therewith. As such, the HVAC outlet housing 32 includes a plurality of HVAC outlet housings 32, with one of the plurality of HVAC outlet housings 32 attached to and associated with one of the plurality of HVAC outlets 28. The baffle 34 includes a plurality of baffles 34, with one of the plurality of baffles 34 disposed within and associated with one of the HVAC outlet housings 32. Each baffle 34 is independently moveable between the open position and the closed position to control the airflow through their associated HVAC outlet housing 32. Furthermore, the baffle controller 38 includes a plurality of baffle controllers 38, with one of the baffle controllers 38 coupled to and associated with one of the baffles 34 to control the movement of the associated baffle 34. Each of the baffle controllers 38 is independently operable relative to the other of the baffle controllers 38. Accordingly, airflow to one portion of the passenger compartment 24 may be blocked, while airflow to one or more portions of the passenger compartment 24 may be opened.

Suitable shape memory alloys for the shape memory alloy actuator system 46 can exhibit a one-way shape memory effect, an intrinsic two-way effect, or an extrinsic two-way shape memory effect depending on the alloy composition and processing history. The two phases that occur in shape memory alloys are often referred to as martensite and austenite phases. The martensite phase is a relatively soft and easily deformable phase of the shape memory alloys, which generally exists at lower temperatures. The austenite phase, the stronger phase of shape memory alloys, occurs at higher temperatures. Shape memory materials formed from shape memory alloy compositions that exhibit one-way shape memory effects do not automatically reform, and depending on the shape memory material design, will likely require an external mechanical force to reform the shape orientation that was previously exhibited. Shape memory materials that exhibit an intrinsic shape memory effect are fabricated from a shape memory alloy composition that will automatically reform itself.

The temperature at which the shape memory alloy remembers its high temperature form when heated can be adjusted by slight changes in the composition of the alloy and through heat treatment. Nickel-titanium shape memory alloys, for example, can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the shape memory material with shape memory effects as well as high damping capacity. The inherent high damping capacity of the shape memory alloys can be used to further increase the energy absorbing properties.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like. For example, a nickel-titanium based alloy is commercially available under the trademark FLEXINOL from Dynalloy, Inc.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a body defining a passenger compartment;
a support structure supported by the body within the passenger compartment and defining a HVAC outlet configured for exhausting a flow of air into the passenger compartment;
a HVAC outlet housing coupled to the support structure and configured for directing the flow of air to the HVAC outlet;
a baffle disposed within the HVAC outlet housing and rotatably moveable about a rotation axis between an open position and a closed position, with the baffle allowing airflow through the HVAC outlet housing when in the open position, and blocking airflow through the HVAC outlet housing when in the closed position; and
a baffle controller coupled to the baffle and actuated in response to an electrical signal to move the baffle between the open position and the closed position, wherein the baffle controller includes an electrically controlled shape memory alloy actuator system;
wherein the baffle controller includes a housing and a valve plate attached to the baffle and rotatably supported by the housing, and a linkage system interconnecting the shape memory alloy actuator system and the valve plate;
wherein the linkage system includes a main lever pivotably attached to the housing for pivotable movement about a pivot axis;
wherein the baffle controller includes a position biasing device interconnecting the main lever and the housing and configured for biasing the baffle into the open position when the baffle is disposed in the open position, and for biasing the baffle into the closed position when the baffle is disposed in the closed position wherein the shape memory allow actuator system includes a first shape memory alloy actuator and a second shape memory alloy actuator disposed in an antagonistic arrangement relative to each other.

2. A vehicle as set forth in claim 1 wherein only one of the first shape memory alloy actuator and the second shape memory alloy actuator is electrically actuated at a time, and wherein electrically actuating one of the first shape memory alloy actuator and the second shape memory alloy actuator contracts the electrically actuated actuator, causing the other of the first shape memory alloy actuator and the second shape memory alloy actuator to stretch.

3. A vehicle as set forth in claim 1 wherein actuation of the first shape memory alloy element pivots the main lever about the pivot axis in a first direction, and actuation of the second shape memory alloy actuator pivots the main lever about the pivot axis in a second direction opposite the first direction.

4. A vehicle as set forth in claim 3 wherein the linkage system includes a first link interconnecting the main lever and the valve plate.

5. A vehicle as set forth in claim 4 wherein the main lever includes a main beam extending between the shape memory alloy actuator and the first link, and a second beam extending from the main beam to a distal end, with the position biasing device connected to the second beam of the main lever at the distal end of the second beam.

6. A vehicle as set forth in claim 5 wherein a longitudinal axis of the main beam and a longitudinal axis of the second beam intersect at the pivot axis of the main lever.

7. A vehicle as set forth in claim 4 wherein the baffle controller includes a cut-off switch configured for interrupting electrical actuation of the shape memory alloy actuator in response to movement beyond a pre-determined limit.

8. A vehicle as set forth in claim 7 wherein the cut-off switch is selected from a group consisting of a contact switch, a photo-interrupter switch or a time limit switch.

9. A vehicle as set forth in claim 4 wherein the baffle controller includes a strain relief mechanism interconnecting the baffle and the valve plate and configured for limiting stress in the shape memory alloy actuator to a predefined limit.

10. A vehicle as set forth in claim 9 wherein the strain relief mechanism includes a split flex plate attached to and moveable with the baffle, wherein the split flex plate includes a first arm portion and a second arm portion extending outward from a core to a distal open end and defining a slot between the first arm portion and the second arm portion.

11. A vehicle as set forth in claim 10 wherein the strain relief mechanism includes a pin attached to the valve plate and extending through the slot in the split flex plate.

12. A vehicle as set forth in claim 11 wherein the strain relief mechanism includes a strain relief biasing device attached to a first distal end of the first arm and a second distal end of the second arm at the open distal edge of the split flex plate, wherein the strain relief biasing device is configured for biasing the first distal end and the second distal end together.

13. A vehicle as set forth in claim 12 wherein the first arm and the second arm of the split flex plate flex relative to each other when the stress in the shape memory alloy actuator system exceeds a pre-defined limit to reduce the rotational torque transferred to the baffle from the linkage system and damage to the shape memory alloy actuator, and wherein the strain relief mechanism is resettable to an initial position in response to further rotation of the baffle relative to the split flex plate.

\* \* \* \* \*